United States Patent
Schiebeler (10) Patent No.: US 9,251,199 B2
(45) Date of Patent: Feb. 2, 2016

(54) STATELESS DATABASE CACHE

(71) Applicant: Dirk Schiebeler, Eppingen (DE)

(72) Inventor: Dirk Schiebeler, Eppingen (DE)

(73) Assignee: SAP SE, Walldorf (DE)

( * ) Notice: Subject to any disclaimer, the term of this patent is extended or adjusted under 35 U.S.C. 154(b) by 209 days.

(21) Appl. No.: 14/074,047

(22) Filed: Nov. 7, 2013

(65) Prior Publication Data

US 2015/0127599 A1 May 7, 2015

(51) Int. Cl.
*G06F 17/00* (2006.01)
*G06F 17/30* (2006.01)
*G06F 12/12* (2006.01)

(52) U.S. Cl.
CPC ........ *G06F 17/30377* (2013.01); *G06F 12/128* (2013.01); *G06F 17/3048* (2013.01); *G06F 17/30492* (2013.01); *G06F 17/30563* (2013.01)

(58) Field of Classification Search
CPC ............... G06F 17/30333; G06F 17/30902; G06F 2212/465; G06F 12/0866; G06F 12/0862
See application file for complete search history.

(56) References Cited

U.S. PATENT DOCUMENTS

2011/0202831 A1* 8/2011 Bruckner et al. ............ 715/246

OTHER PUBLICATIONS

Extended European Search Report for European Patent Application No. 14192215.3, dated Jun. 15, 2015.
"Using Oracle In-Memory Database Cache to Accelerate the Oracle Database", Jul. 31, 2009, XP055121333, Retrieved from the Internet: URL:http://www.oracle.com/technetwork/database/performance/wp-imdb-cache-130299.pdf [retrieved on Jun. 3, 2014].
Elmasri et al., "Chapter 5: More SQL: Complexes Queries, Triggers, Views, and Schema Modification", Fundamentals of Database Systems, 6th edition, Jan. 1, 2011, pp. 115-143, XP009171303, ISBN: 978-0-13-608620-8.
Agrawal et al., "DBXplorer: a system for keyword-based search over relational databases", Proceedings of the 18th International Conference on Data Engineering, San Jose, CA, Feb. 26-Mar. 1, 2002; IEEE Computer Society, US, vol. CONF. 18, Feb. 26, 2002, pp. 5-16, XP010588195, DOI: 10.1109/ICDE.2002.994693 ISBN: 978-0-7695-1531-1.

* cited by examiner

*Primary Examiner* — Truong Vo
(74) *Attorney, Agent, or Firm* — Kenyon & Kenyon LLP (57) ABSTRACT

A cache and method of caching for a database are provided, in which the cache and the database are in the same state. Responsive to a query for data, the method extracts search terms from the query and maps filter settings to an appropriate format. The method also (a) outputs data retrieved from a cache, if there is a cache hit and (b) builds cache and retrieves the data from the database, if there is a cache miss. If there are multiple users and/or instances, the cache may be updated for all users and/or instances by determining whether all changes are to be committed, in which case the changes are pushed to all users and/or instances.

20 Claims, 11 Drawing Sheets

| COMPONENT | DESCRIPTION |
|---|---|
| MANDT | Client |
| RELID | Region in importable and exportable data table |
| USERID | User Name |
| ENTITY | Entity Name that may be used to determine the data structure of the cluster data |
| SRTF2 | Next record counter in importable and exportable data tables |
| TIMESTAMP | Timestamp that may be used to record events for a particular user and entity |
| LINES | Natural number indicating the number of lines in the table |
| STATUS | Status of the cache |
| CLUSTR | Length field for user data in writing and reading data |
| CLUSTD | Cluster Data |

STATELESS DATABASE CACHE

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

TECHNICAL FIELD

The invention relates to caching of databases; and, in particular, to building and updating a cache for which the cache state and the database state are the same.

BACKGROUND

A content server, e.g., a database, may provide data to a requesting client, e.g., a web browser, via a data retrieval apparatus, e.g., middleware. Among performing other functions, the data retrieval apparatus may be configured to filter data retrieved from the content server and sent to the client, and cache data sent to the client for subsequent requests. Responsive to a client's request for data, the data retrieval apparatus may check whether the requested data had been previously requested by the same or a different requesting client and stored in a separate area of memory, e.g., cached. If the requested data had been previously cached, the data retrieval apparatus may return a copy of the cached data to the client, instead of retrieving data from the content server. Each data request from any client opens a new connection to the middleware, and upon resolution of the data request, the connection is terminated and resources, e.g., allocated memory, buffers, etc., are freed.

The interaction between the client and the server described herein may be realized in a Business Object Processing Framework (BOPF) in which interactions between the client and the server may be modeled by business objects (BO). The BOs may have associations and communication links to each other that facilitate business transactions and processes.

DETAILED DESCRIPTION

Accessing data from memory (e.g., a database) is typically a time-consuming function, a challenge that is compounded by complex queries for the data. In the context of software that enables multiple users to make a transaction by means of middleware, timing is a factor in usability, because real-time or near real-time updates to data accessible, editable, and/or viewable by the multiple users will affect decision-making regarding the transaction. The middleware may be a gateway and/or server. One example software that facilitates transactions is the SAP Transportation Management application, which forms a part of the SAP Supply Chain Management (SCM) software. A carrier (e.g., a customer) may access the SAP Transportation Management application via a portal and middleware. For example, the customer may request or edit data of the application. Each data request may open a connection to the middleware that in turn accesses the back-end, selects and calculates data, and returns the requested data to the customer. Upon completion of relaying the requested data to the customer, the connection is terminated, and all resources, including allocated memory and buffers are freed (e.g., cleared).

The query to the application may be a complex instruction including selecting, sorting, calculating, and/or requesting attributes. For example, in the context of a business transaction between a carrier and a vendor, the query may include address details, routing information, tendering request, and/or quotation details. Additionally, numerous carriers may be offering bids to deliver the goods that a vendor has sold. The various carriers using the application may submit the bids in the form of queries to the application, which queries update the content of a back-end (e.g., a database) linked to the application. Carriers and vendors may view the updated bids by querying the application to return requested data from the database. The data requested by a query may be located in separate database tables, and various helper methods may be called to access the data or perform calculations. Thus, the complexity of a single query may result in long response times, for example, more than 15 seconds. Furthermore, because the portal is stateless and a connection is opened and closed with each query, a single query requires a roundtrip to the database.

An unstructured cache may be provided in such a system to improve response times. Runtime performance may be improved by caching, because storing data or a copy of data in a more accessible location increases the speed of interactions between a content server and a data access client, e.g. reading from and writing to the content server, paging, sorting, searching, and filtering. Once a request has been made, subsequent requests are much faster, because storing data in the cache eliminates complex selection logic for the database. In an embodiment, the cache is structured as a cluster table, which is further described herein. In another embodiment, the cache is structured as a database table, which is also further described herein.

Because caches are typically cleared with the closing of a connection, for instances in which connections are frequently opened and closed, the application is prevented from taking advantage of the benefits of caching. Thus, a stateless cache, that is, a cache that is in the same state as its corresponding database retains the benefits of improved speed, even if connections are frequently opened and closed, because each new data request may access the cache, which is retained through multiple data requests. In the context of a BOPF system, the cache may be included into a BOPF transaction manager. The BOPF transaction manager manages all changes that occur during a transaction, e.g. a SAP Transportation Management transaction. Thus, upon saving a transaction, relevant changes for the cache may be identified and updated for changed instances. In an embodiment, the cache is updated on-the-fly, at the same time that changes to the database are saved via the BOPF. For example, the cache may improve response time to less than one second compared with 15 seconds without the cache.

Integration of the Stateless Cache with Middleware

Figure 6:
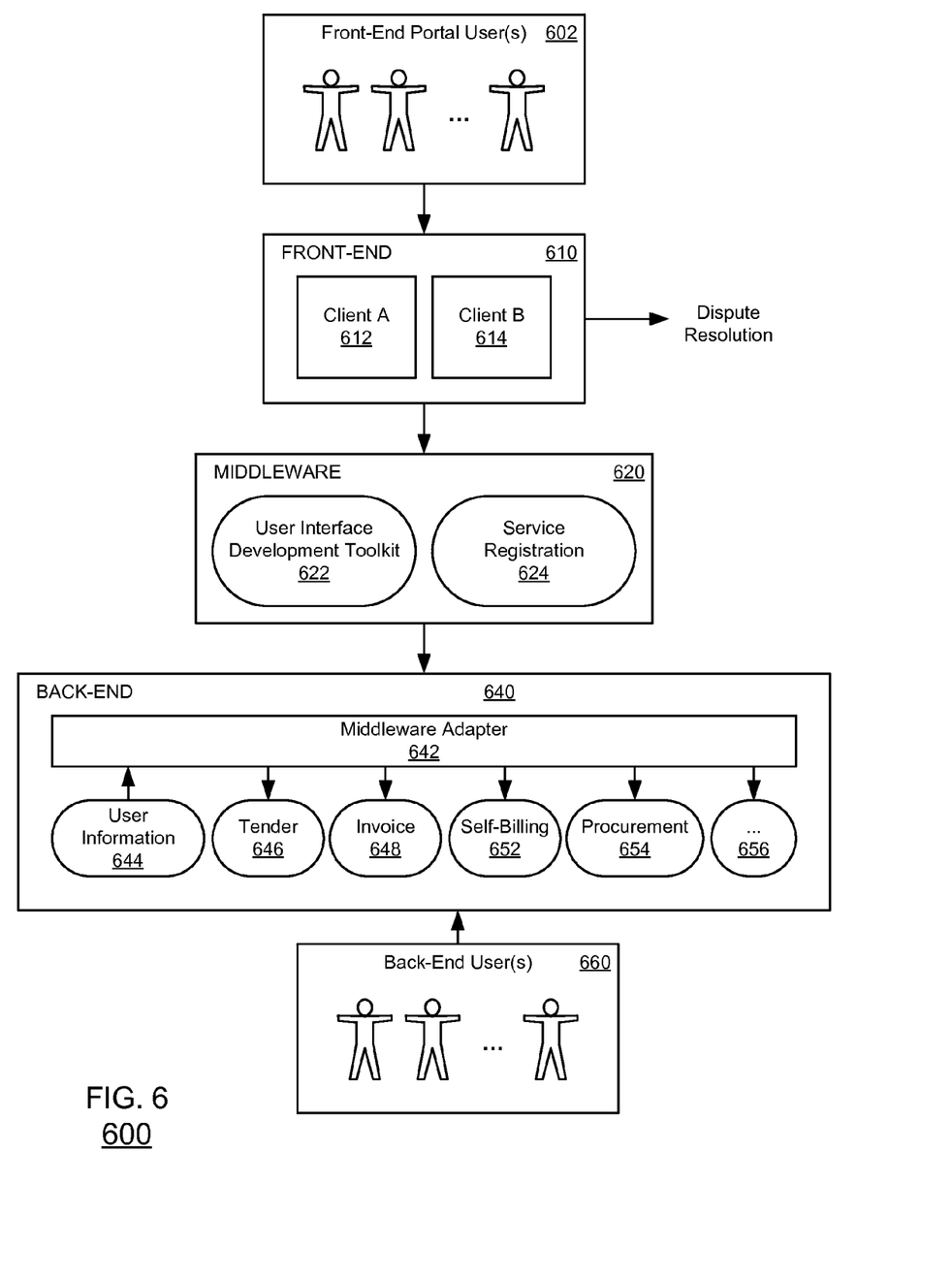
FIG. 6 is a block diagram of a system in which a method of building and using a cache can be implemented according to an example embodiment.

The stateless cache described herein may be integrated with middleware in a system, so that the cache may be accessed and edited by various users. FIG. 6 is a simplified block diagram of a system 600 in which a method of building and using a cache may be implemented according to an example embodiment. In the context of an SAP Transportation Management collaboration portal, the caching may be performed by middleware, which middleware interfaces with a front-end and back-end as described herein. The middleware may function as an adapter mapping and/or converting data between various formats. One advantage of interacting with the middleware is that even if developers are only familiar with a limited number of data formats, they may still be able to work with data in the back-end, because the middleware converts between different data formats. The middleware may then perform caching functions based on commands from a developer.

The system 600 may include a front-end platform 610 ("front-end" for simplicity), a back-end platform 640 ("back-end" for simplicity), and middleware 620. The system 600 may also include front-end user(s) 602 and back-end user(s) 660, who respectively access the front-end 610 and back-end 640. The direction in which data is transmitted is represented by the direction of arrows shown in FIG. 6. Although shown in a single direction representing the primary direction of data flow, communications between the various blocks may be also be bi-directional. For example, back-end user(s) 660 interact with back-end 640, for example, by issuing commands to the back-end, but the back-end 640 may also provide information, e.g., requested data, to the back-end user(s) 660 as well.

The front-end 610 may include various clients 612 and 614. These clients may be desktop browsers, tablet browsers, etc. The front-end 610 may function as a portal in which front-end users 602 may access and edit back-end data. The middleware 620 may function as a gateway and/or interface between the front-end 610 and back-end 640. The middleware 620 may include a user interface (UI) development toolkit 622. The UI development toolkit may be for HTML5 (SAPUI5). The UI development toolkit may also involve Business Server Pages (BSP). For example, BSP may integrate dynamic web pages into the backend, anchor SAPUI5 sources, and be used for other support and maintenance functions. The middleware 620 may also include service registration 624, which may facilitate a business transaction between front-end user(s) 602 and back-end user(s) 660. The back-end 640 may be an SAP TRANSACTION MANAGER. The back-end 640 may include a middleware adapter 642. The middleware adapter 642 may be provided with user information 644 from back-end user(s) 660. The middleware adapter 642 may further provide data regarding tender 646 and invoice 648, invoice self-billing 652, strategic freight procurement 654, and additional functionalities 656 such as forwarding order creation via portal 602.

In operation, front-end user(s) 602 may engage in various business transaction functions with the front-end 610. These functions may include accepting an Request for Quotation (RFQ), rejecting an RFQ with or without changes, accepting invoice, starting dispute resolution processes, and creating an invoice. The front-end 610 may retrieve UI sources from the middleware 620, get other data, and create quotations. The front-end may also proceed to dispute resolution, for example with SAP Jam. The middleware 620 may request data and creation of quotations from the back-end 640. The Back-end User(s) 660 may provide and/or manipulate data to the back-end 640.

Figure 1:
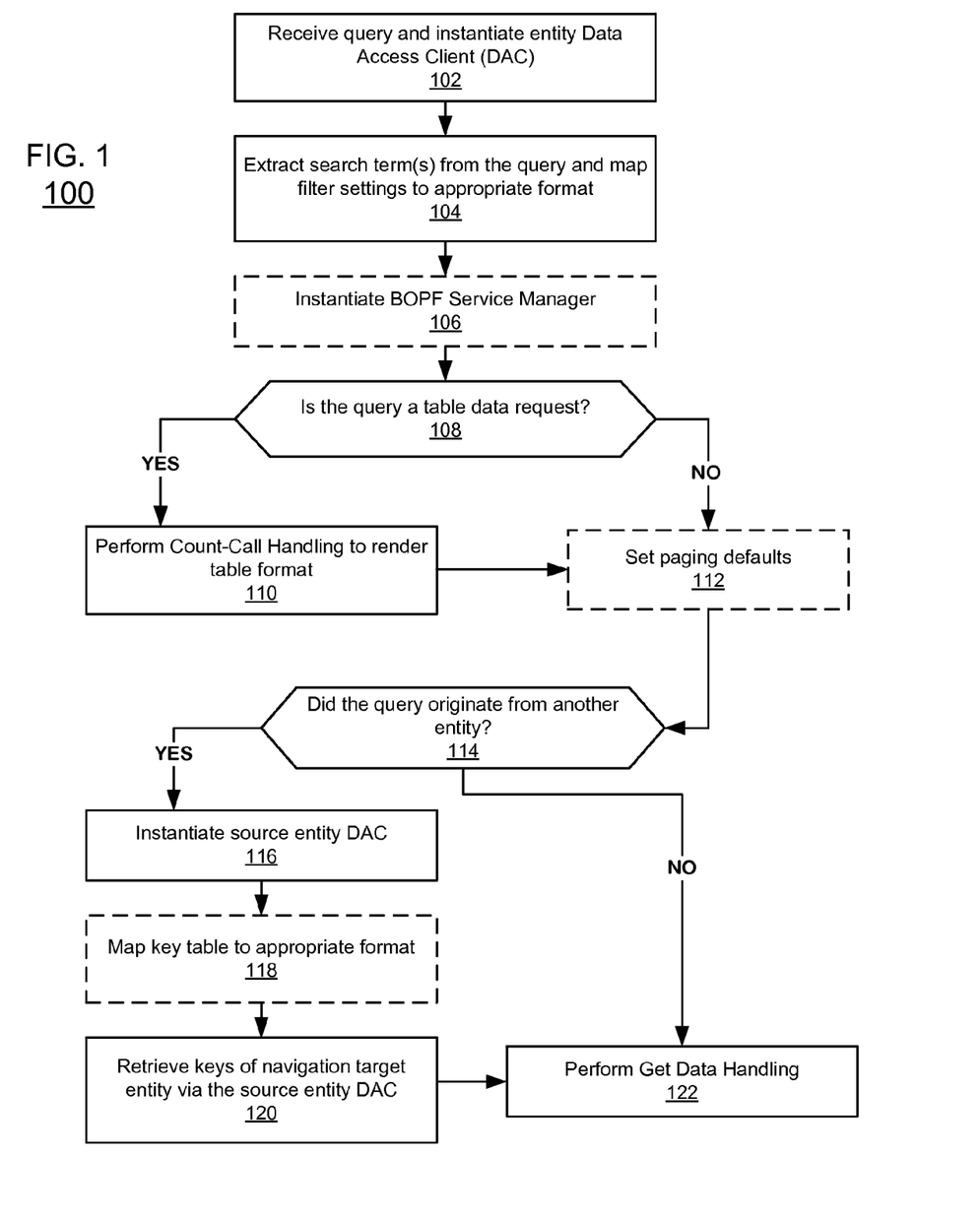
FIG. 1 is a flowchart illustrating a method of building and using a cache according to an example embodiment.

FIG. 1 is a flowchart illustrating a method 100 of building and using a cache according to an example embodiment. In step 102, the method 100 may receive a query, and responsive to the query, instantiate an entity Data Access Client (DAC). The entity DAC may be specific to a particular entity, for example the entity that called the method 100. In a step 104, search term(s) may be extracted from the query received in step 102, if the query includes search terms. In one embodiment, the search may be performed as a fuzzy search, where all of the data in an entity is searched for a match to the search term. For example, if "main" is an extracted search term from a query, the search may return documents containing "main" somewhere within the documents, including documents referring to "Main Street," "Main River in Frankfurt," "main stage of transportation," etc. The search may also convert codes into corresponding description in different languages such as the language with which a user is logged into the system. The search may search descriptions rather than technical codes. This may be advantageous because a user typically interacts with the system using descriptions instead of technical codes. In another embodiment, a system may include a black list of technical fields, which black list may be predetermined and/or modified based on interactions with a user. If a search term is in the black list, the search term is not searched or excluded from a fuzzy search. For example, the black list may include technical fields such as graphical user interface identifiers (GUIDs) and other technical values that are not displayed on the UI.

If multiple formats are involved, then filter settings may be mapped and/or converted to an appropriate format. For example, in the context of SAP BOPF, filter settings may be mapped from the middleware format to the BOPF format. Optional step 106 may be performed by the method 100, if operating in the context of BOPF. In optional step 106, a BOPF Service Manager is instantiated. For example, the BOPF Service Manager may be instantiated in a transaction layer of BOPF architecture as described herein relation to FIG. 10. For example, in ABAP coding, if a BOPF Service Manager is requested for the first time within a transaction, a service manager for a BO may be requested from a BOPF via a service manager factory. If a BOPF Service Manager has been previously requested, i.e., the BOPF transaction manager is already available, then the new service manager instance is registered as the transaction manager. If a service manager is already registered for the requested BO, the registered service manager may be returned as the BOPF Service Manager.

Figure 10:
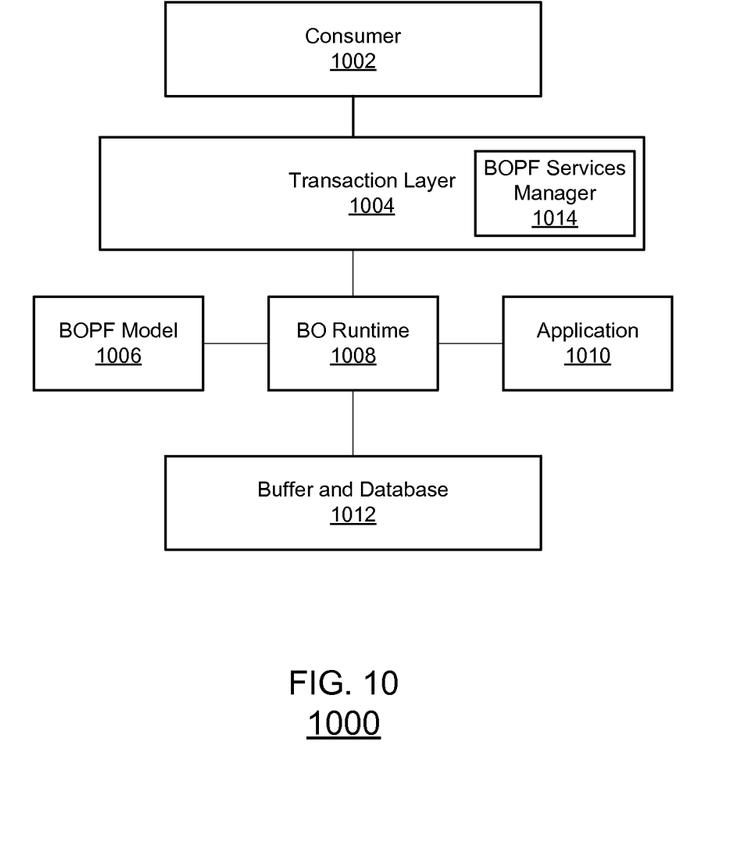
FIG. 10 is a block diagram of a Business Object Processing Framework (BOPF) architecture according to an example embodiment.

FIG. 10 is a block diagram of a Business Object Processing Framework (BOPF) architecture 1000 according to an example embodiment. The architecture 1000 may include a consumer 1002, a transaction layer 1004, a BOPF Model 1006, a BO Runtime 1008, an application 1010, and a buffer and database 1012. The consumer layer 1002 may use services provided by the transaction layer 1004 to access BO instances and to control transactions. The transaction layer 1004 may include a central transaction manager instance, e.g., BOPF Services Manager Instance 1014 that may allow a consumer to save all changed BO instances of a current transaction. The BOPF Service Manager Instance 1014 for each BO may provide services to access all BO object instances of each BO. Such services may include reading data from BO instances. For example, in step 106 of method 100, the BOPF Service Manager 1014 may be instantiated. The BOPF Model 1006 may store and organize data regarding each modeled BO. The BO Runtime 1008 may execute the requested services and instantiate and invoke the application 1010, which may implement classes of entities of a BO. After an action has been executed, BOPF may return the result to the consumer 1002. The buffer and database 1012 may provide space for BOs to autonomously buffer database accesses and manage transactional changes. However, the buffer and database 1012 is not to be confused with the cache, differing, for example, in that the buffer is freed at the end of each connection as described herein.

The method 100 may then proceed to step 108, in which the method 100 determines whether the query received in step 102 is a request for a particular data format such as data in tabular form ("table data"). If the request is for table data, the method 100 proceeds to step 110 before step 112, in which a count-call method or sub-routine may be called to render the formatting for the table. For example, the count may correspond to the number of entries or number of rows in the table data, and the count-call constructs the table prior to populating it with data. The count-call handling is further described herein in relation to FIG. 2. If, in step 108 it is determined that the query is not a table data request, or upon completion of step 110, the method 100 proceeds to optional step 112. In step 112, if desired, commanded, or necessary, paging defaults may be set. For example, paging may determine how much data is displayed on a UI at once. Paging defaults may represent how much data is viewable on a single page or represent how a corpus of data is split over multiple pages, a subset of which is viewable at a single time by a user.

In step 114, the method 100 determines whether the query received in step 102 originated from another entity. For example, it may be the case that the query did not originate with the entity that called the method 100 but rather with another entity ("source entity"), and the query was then relayed by the current entity. If the query originated from another entity, the method 100 then proceeds to check navigation paths. Navigation paths may be provided by the middleware, and may be derived from the middleware metadata. For example, navigation paths may be provided by a gateway, which navigation paths may be derived from gateway service metadata. Checking navigation paths may include steps 116, 118, and 120. In step 116, the method 100 may instantiate a source entity DAC, and is further described herein in relation to FIG. 11.

Figure 11:
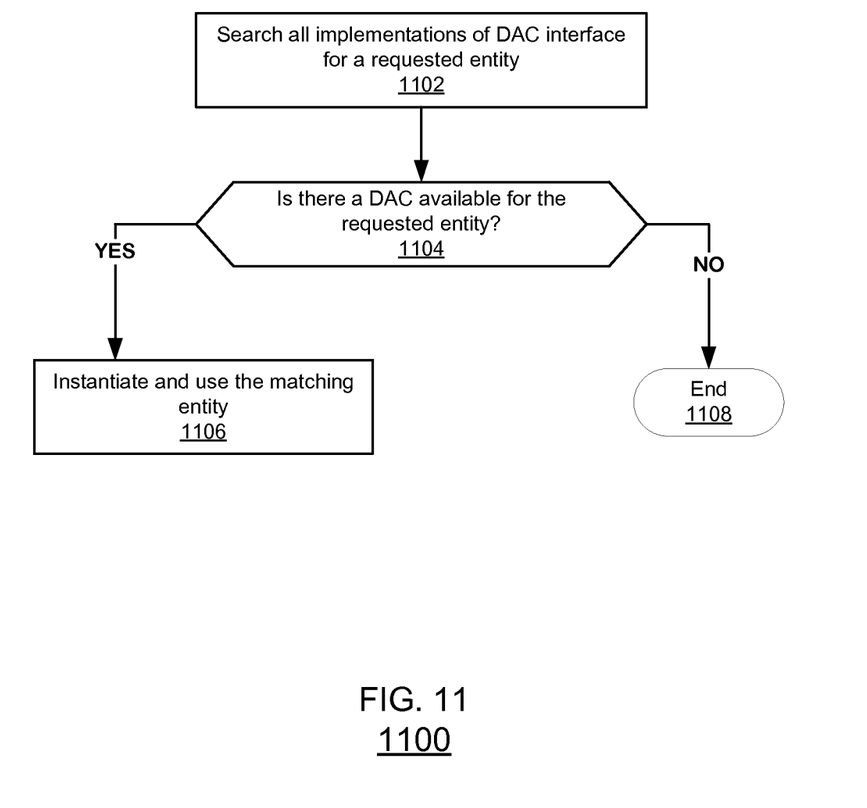
FIG. 11 is a flowchart illustrating a method of instantiating a source entity data access client (DAC) according to an example embodiment.

FIG. 11 is a flowchart illustrating a method 1100 of instantiating a source entity DAC according to an example embodiment. In an embodiment, a DAC is associated with every entity that is handled by a middleware service manager. Each DAC may be associated with a middleware service and an entity. For example, the middleware service and entity to which a DAC belongs may be stored in a class of the DAC as static public member variables. The method 1100 may be performed by the middleware service manager. In step 1102, the method 1100 may check all implementations of a DAC interface for a requested entity. In step 1104, the method 1100 may determine whether a DAC is available for the requested entity. For example, the entity requested by method 100 in step 116 may be a source entity. If a DAC is determined to be available in step 1104, the method 1100 instantiates and uses the matching entity in step 1106. However, if no DAC is available for the requested entity, the processing of the data request may be canceled, and an exception generating a message may be displayed on a UI in step 1108. The error message displayed may include information regarding a current service with which the data request is performed and a name of the entity for which no DAC is found such that a user receiving the message may appropriately inform implementers of the missing implementation. Steps 1102 and 1104 may be performed more quickly than conventional methods, because the entity information (for example, the static public variables) provides information regarding the DAC classes without instantiating all available DACs. Upon completion of steps 1106 or 1108, the method 1100 may return to step 118 or step 120 of method 100.

Optional step 118, in which a key table is mapped to an appropriate form, may then be performed by the method 100, if multiple formats are involved. In step 120, keys of a navigation target entity are retrieved using the source entity DAC. Upon completion of step 120 or responsive to a determination in step 114 that the query did not originate from an entity other than the one initiating the method 100, the method 100 proceeds to step 122. In step 122, the method 100 retrieves data from a cache. The steps involved in data retrieval from the cache may be performed as additional steps in method 100 or as a sub-routine and is further described herein in relation to FIG. 3.

Figure 2:
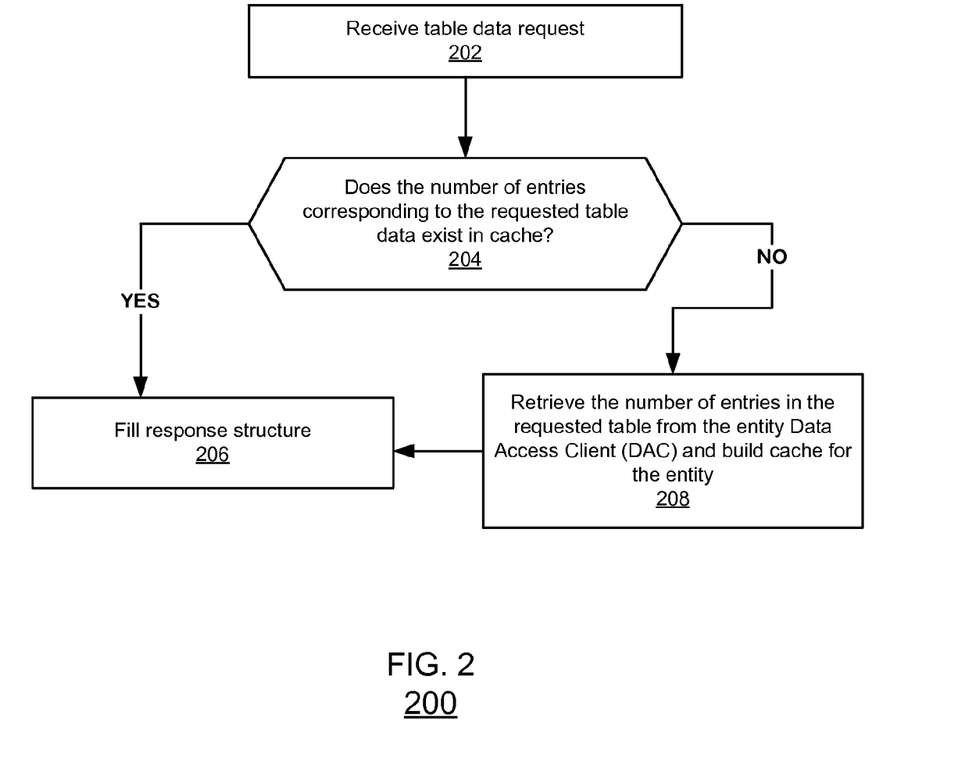
FIG. 2 is a flowchart illustrating a method of constructing a table based on table data availability in a cache according to an example embodiment.

FIG. 2 is a flowchart illustrating a method 200 of formatting a table based on table data availability in a cache according to an example embodiment. The method 200 may be called by method 100 to retrieve information for formatting a table, for example the number of rows and columns. In step 202, the method 200 receives a request for table data, which request may be based on the query received and/or parsed in steps 102 and/or 104 of the method 100. In step 204, the method 200 determines whether there has been a cache hit, i.e., the count or the number of entries corresponding to the table data requested in step 202, exists in cache. If there is a cache hit, then the method 200 proceeds to step 206, in which a response structure is constructed. That is, for the case of table data, the filling of the request response may be constructing the skeleton of the response structure. Otherwise, if there is a cache miss in step 204, the method 200 proceeds to step 208. In step 208, the count is retrieved from the back-end, for example, the number of entries in the requested table is retrieved from the entity DAC. In step 208, the cache may also be built for the entity. Methods for building cache are further described herein, e.g., in relation to FIG. 4. Upon completion of method 200, execution may continue in method 100, for example continuing in step 112 or step 114.

Figure 3:
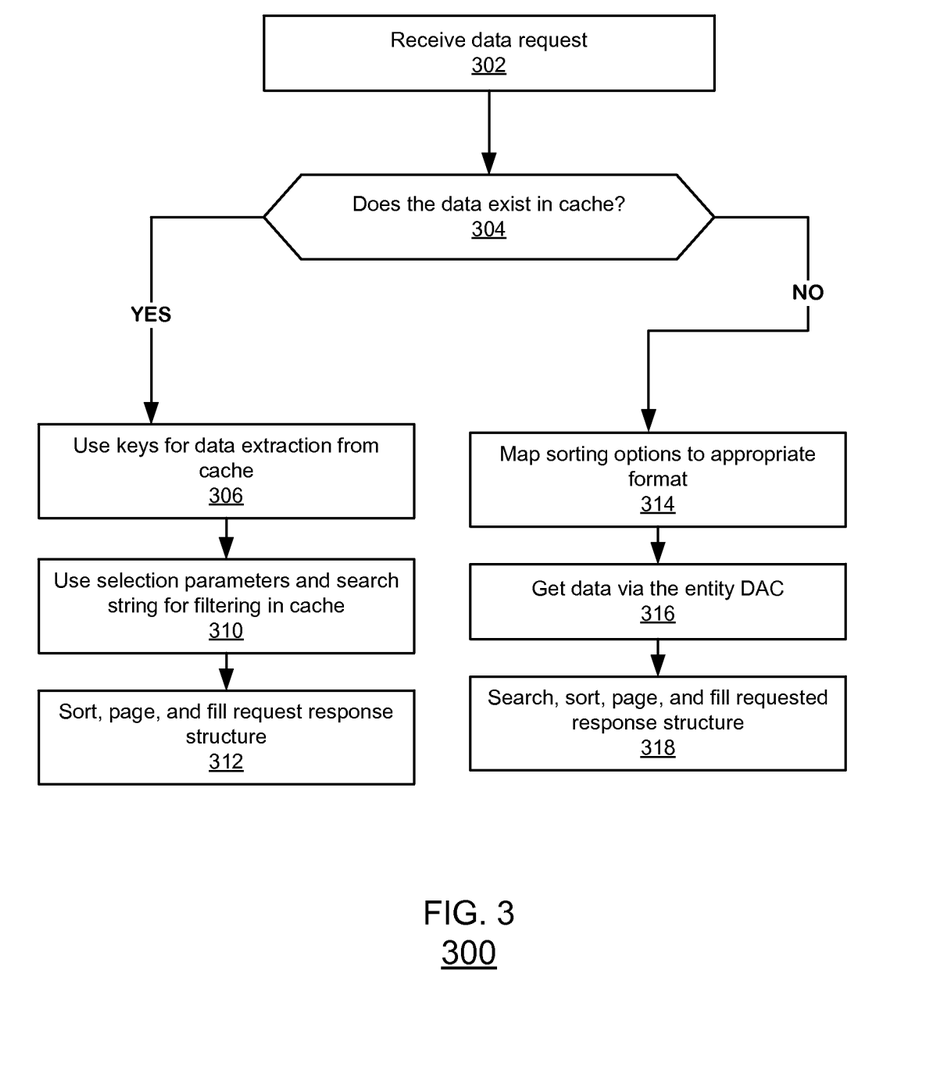
FIG. 3 is a flowchart illustrating a method of retrieving data based on availability in a cache according to an example embodiment.

FIG. 3 is a flowchart illustrating a method 300 of retrieving data based on availability in a cache according to an example embodiment. In step 302, the method 300 receives a data request. Similar to method 200, the data request may be based on the query received and/or parsed in steps 102 and/or 104 of method 100. For the case of table data, the data request may be the same request as that received in step 202 of method 200. For example, the first time the request is made, method 200 may be called, while for subsequent requests, method 300 may be called. That is, the request may be the same each time it is made, but different methods may be invoked based on whether or how many times the request was previously made. In step 304, the method 300 determines whether the data exists in cache. If there is a cache hit in step 304, then the method 300 proceeds to extract the table data from the cache in steps 306 to 312. In step 306, the method 300 uses keys for data extraction from the cache. In a BOPF context, the keys may be BOPF keys. In step 310, the method 300 uses selection parameters and a search string for filtering in the cache. In a BOPF context, the selection parameters may be BOPF parameters. The selection parameters and/or search string may be based on the query and/or search term(s) extracted in step 104 of method 100. In step 312, the method 300 sorts, pages, and fills the response structure. For the case of table data, a skeleton of the response structure (e.g., a table) may already be constructed and/or formatted by count-call handling, described herein, e.g., with respect to FIG. 2. That is, for the case of table data, the sorting, paging, and filling of the request response may be filling the skeleton of the response structure. In step 304, if there is a cache miss, the method 300 proceeds to step 314. In step 314, sorting options are mapped to an appropriate format. In the context of BOPF, middleware sorting options may be mapped into BOPF sorting options. In step 316, the method 300 retrieves the data requested in step 302 via the entity DAC. Upon retrieval of the data in step 316, the method 300 proceeds to step 318, in which the requested response structure may be searched, sorted, paged, and filled.

Figure 4:
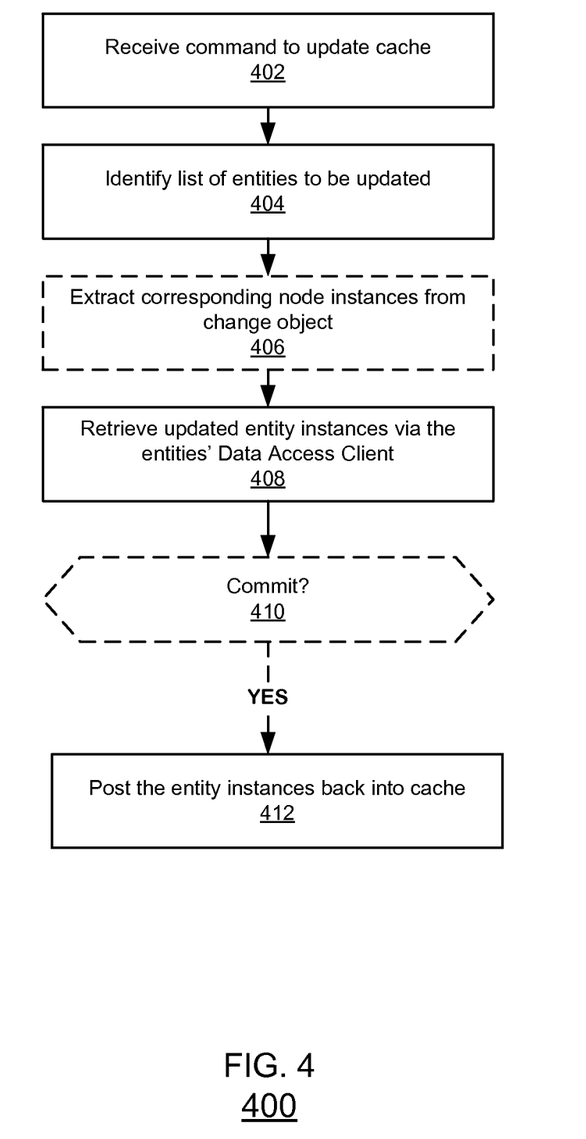
FIG. 4 is a flowchart illustrating a method of updating a cache according to an example embodiment.

FIG. 4 is a flowchart illustrating a method 400 of updating a cache according to an example embodiment. The cache may be updated after changes are made in a back-end, so that all users may view up-to-date information. In step 402, the method 400 may receive a command to update the cache. In the context of BOPF, the method 400 may also receive a corresponding BOPF change object from which cache instances that have been changed and need to be updated may be derived. The BOPF change object may be a repository for changes made in a transaction. BO nodes may be mapped to middleware entities by being declared in a DAC. In step 404, a list of entities to be updated may be identified, for example based on the BO nodes mapped to the entities. Method 400 may be performed for each changed node key, where a node key identifies a BO node. In step 404, the list of entities to be updated may be returned if a current node has been changed. In the context of BOPF, in optional step 406, corresponding node instances are extracted from the change object. For example, the middleware may extract corresponding node instances from the change object, which corresponding node instances may be used to retrieve updated entity instances by getting data from the entities' DAC in step 408. The data may be retrieved from the entities' DAC according the method 300. In step 412, the entity instances may be extracted, updated, and posted back in the cache based on the retrieved data.

For the case of BOPF, an optional commit step 410 may be performed subsequent to step 408 and prior to step 412. For example, a BOPF TRANSACTION MANAGER may coordinate and/or supervise posting all relevant changes via involved BO Service Managers, including document changes, made within one Logic Unit of Work (LUW) to related BOs so that the posting is conducted in a correct and consistent sequence. This insures that all changes are handled correctly, and that the BO instances are consistent and in a valid state after the changes. One way in which changes are posted may be through a commit/roll process. In a commit/roll process, either all or none of the changes may be posted.

At the end of a mechanism, but before posting to a database, the caching methods discussed herein may be performed. That is, the cache update may be registered upon a determination to commit in step 410, in which based method 400 proceeds to step 412. However, if the changes are rolled back, the cache is not updated and remains as it was.

Figure 9:
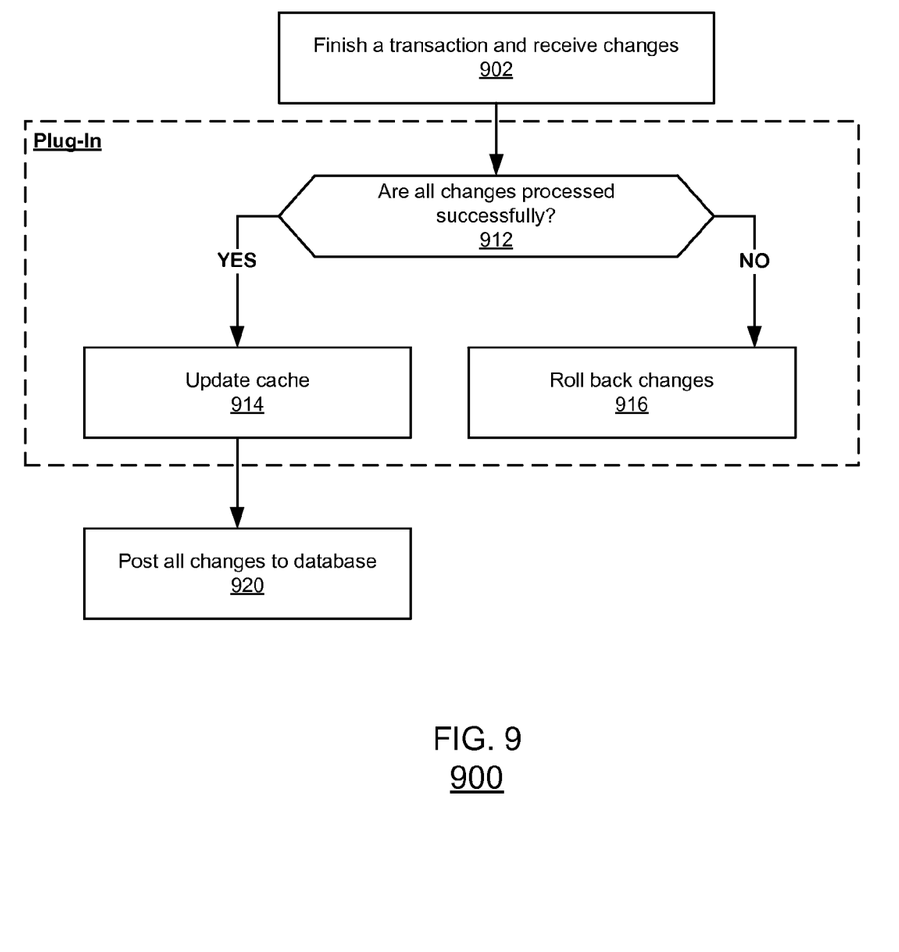
FIG. 9 is a flowchart illustrating a method of committing changes according to an example embodiment.

FIG. 9 is a flowchart illustrating a method 900 of committing changes according to an example embodiment. In step 902, a transaction may be completed and method 900 may receive changes made during the transaction. For example, during cache update registration, the list of changes of the BOPF transaction may be provided as an input. In step 912, method 900 may determine whether all changes are processed successfully, for example, no errors occurred and/or runtime results match expected results. If all changes are processed successfully, in step 914, the changes may be committed, i.e., the cache may be updated, for example according to the methods described herein. The method 900 may also proceed to step 920, in which all changes are posted to a database 920. If not all the changes are successful, for example, at least one error occurred, in step 416, the changes may be rejected and not be permanently saved, i.e., the changes may be rolled back. The update, for example steps 912, 916, and 916, may be implemented as a plug-in mechanism executed at the end of a transaction.

Architecture of the Cache

Figure 5:
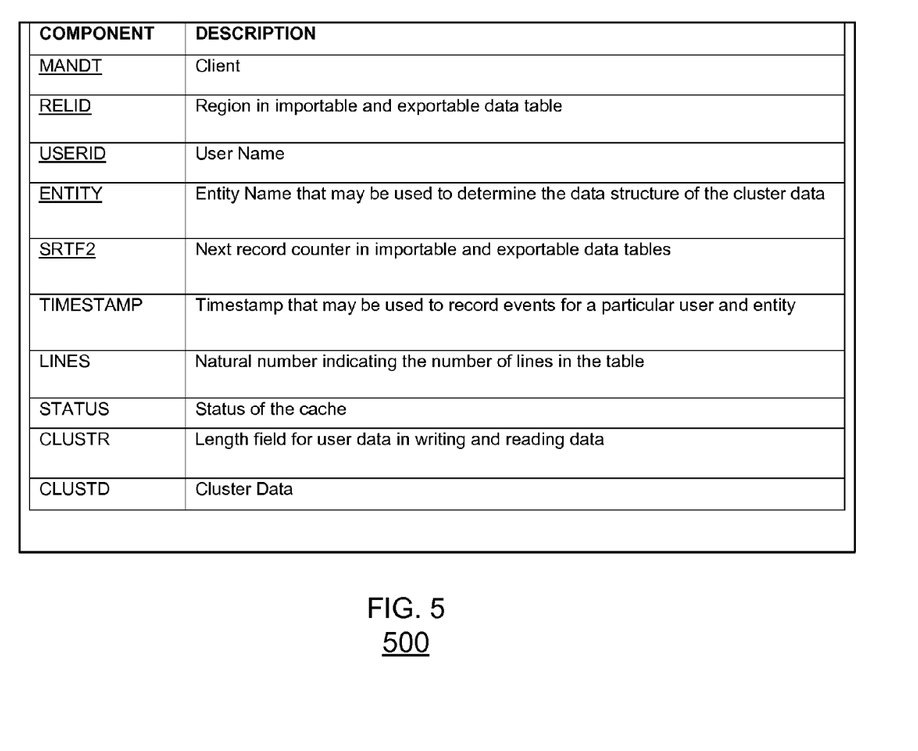
FIG. 5 shows an architecture of a cache according to an example embodiment.

FIG. 5 shows an architecture of a cache 500 according to an example embodiment. The cache 500 may be a cluster table which may store data. The cluster table may comprise one or more buckets. A bucket may be defined by a maximum number of bytes it contains, e.g., 32 kB. The number of buckets in a cache or storable by a user may be predefined. Alternatively, buckets may be added when necessary without limit. The cluster table may be supported by SAP NETWEAVER and may be manipulated by Advanced Business Application Programming (ABAP) commands.

Each bucket (alternatively, "data table") may contain data organized according to example components (i.e., variables or identifiers) shown in FIG. 5. MANDT may refer to a client with which the data in the bucket is associated. In an alternative embodiment, for monolithic programs that are installed once and just for a single client, the MANDT field may be omitted. RELID may refer to region(s) in the data table that is readable or writable. USERID may identify a user name. ENTITY may identify the name of a middleware entity, and may be used to identify or determine a data structure of the cluster data. SRTF2 may refer to a bucket counter in readable and writable data tables. For example, the bucket counter may identify the sequence of buckets within the cluster table by numbering each bucket. TIMESTAMP may record relevant events, for example in UTC long form. Relevant events include, but are not limited to, a last time of update for a particular user and entity. LINES may indicate the size of a data table, for example the number of rows in the table. STATUS may indicate the status of a cache, such as whether or not the cache is ready. For example, while the cache is being built up for the first time or after an invalidation of the cache, the cache may be unavailable, which may be signified by the STATUS. If a cache is unavailable, data may be fetched directly from a database instead as further described herein. Once a cache becomes available, the STATUS identifier may be changed to signify that the cache is available. CLUSTR may refer to a length field for user data in readable and writeable region(s) of a data table. CLUSTD may refer to cluster data.

In an alternative embodiment, the cache may be implemented as a database table with attributes. The database table may include attributes similar to the ones described above for cluster tables. CLUSTR may be replaced with a RAWSTRING of unlimited length. The attributes of the database table may include CLIENT, SERVICE, ENTITY, STATUS, TIMESTAMP, LINES, and DATA having similar properties to the attributes described above in relation to cluster tables unless otherwise specified herein.

Middleware may use various methods to read and write to the cache 500. For example, a read method may extract a single instance or a set of instances meeting a criterion. Determination of whether one or more instances meet a criterion may be by filter select options, fuzzy search string, or other data search and processing methods.

A build method, further described herein, may add data to a cache, or if the data already exists in the cache, may overwrite corresponding data. If a cluster table is used as the cache, the build method may also populate associated components, for example, identifying the user whose query caused the extraction of data and parallel building of cache.

An update cache method, also further described herein, may be called for an entity and/or a user. The update cache method may be provided with an object or other indicator containing notification for created, deleted, or updates instances. That is, for example, in the context of BOPF, a BOPF change object containing BOPF notifications for created, deleted, or updated BO instances may be provided to the update cache method. The update cache method may extract keys of changed instances from the change object, and use the keys to extract a state of the instances from a back-end containing data. Thereafter, deleted and updated instances may be removed from the cache, and updated and created instances may be inserted into the cache. Removal and/or insertion of deleted and updated instances may be by means of the build cache method described herein.

An invalidate cache method, also further described herein, may delete instances from the cache responsive to a command, which command may be by a particular user. A single instance, a subset of instances, or all instances of an entity may be removed from the cache. The removal operations may be performed directly on database table(s) with program-specific methods or standard Structured Query Language (SQL) commands. The invalidate method may be called from the User Interface Development Toolkit 622. In an embodiment, a refresh button may be provided in the toolbar of every collaboration portal user interface. Selection of the refresh button may dispatch a command to perform the invalidate cache method. Upon clearing the cache content, the cache may be built anew. The invalidate cache method provides some redundancy with the update cache, and may refresh the cache should any updates hang or any other processes proceed not as expected.

Figure 7:
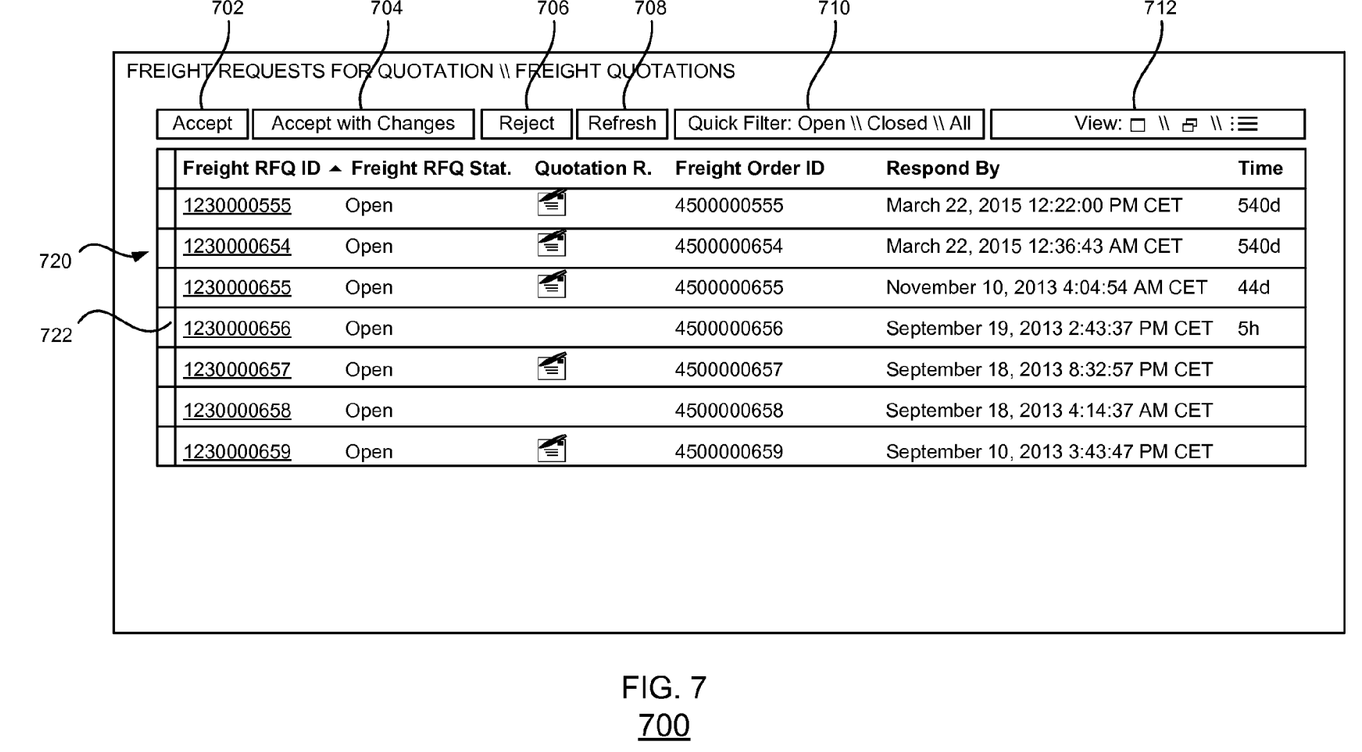
FIG. 7 is a block diagram of a user interface implementing methods and systems described herein and according to an example embodiment.

FIG. 7 is a block diagram of a UI 700 implementing methods and systems described herein and according to an example embodiment. A front-end user may interact with the system 600 via UI 700. A back-end user may interact with the system 600 via a similar UI. UI 700 includes exemplary buttons 702, 704, 706, 708, 710, and 712, which, when selected, send commands to the back-end to perform various functions described herein. UI 700 may also include a viewing area 720, which may include selectable elements 722, which may display additional information regarding a particular set of data. The viewing area 720 may display data from a database and/or calculations performed on the data in an organized manner. For example, the viewing area 720 may display information from a cluster table. The TIMESTAMP may be displayed as a "Respond By" date for a particular entry. For example, for the entry corresponding to Freight RFQ ID 1230000656, the TIMESTAMP is Sep. 19, 2013 at 2:43:37 PM CET. The data in viewing area 720 may be organized, filtered, and/or refreshed by selecting buttons 702 to 712. For example, the "Quick Filter" button 710, may include options such as displaying open orders, closed orders, or all orders. Selection of closed orders, for example, may send a query to the method 100, which would retrieve the requested data from cache and/or the back-end. Selection of the "Refresh" button 708 may send a command to run the invalidate cache method described herein. In relation to runtime performance, the methods described herein may improve the speed of displaying data in the viewing pane 720, because a command made via selection of buttons and/or elements on UI 700 may trigger the methods described herein causing retrieval from and/or performance of stateless cache.

Figure 8:
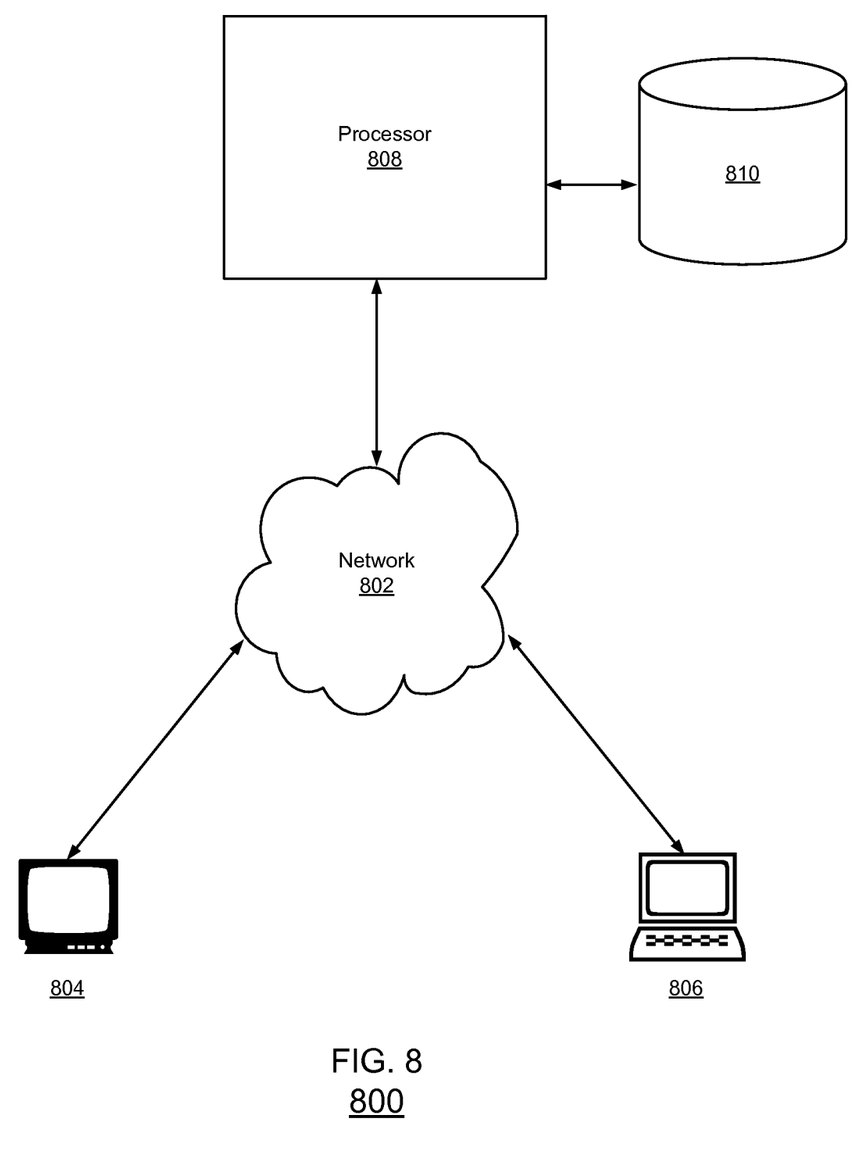
FIG. 8 is a block diagram of a system implementing methods and systems described herein and according to an example embodiment.

It should be also appreciated that the present invention can be implemented in numerous ways, including as a process, an apparatus, a system, a computer processor executing software instructions, or a computer readable medium such as a computer readable storage medium or a computer network wherein program instructions are sent over optical or electronic communication or nontransitory links. For example, FIG. 8 shows an example system 800 that includes a processor 808 in communication with a computer-readable medium 810. The computer-readable medium 810 may include instructions executable by the processor 808, such that, when the processor 808 executes various portions of the instructions, the instructions cause the processor 808 to perform the various methods described herein. It should be noted that the order of the steps of disclosed processes may be altered within the scope of the invention, as noted in the appended Claims and in the description herein. The example system further includes terminals 804 and 806. For example, one terminal 804 may be used by a front-end user to interact with system 800, and the other terminal 806 may be used by a back-end user to interact with the system 800. The processor 808 and clients 804 and 806 may be in communication via network 802, which may be the Internet. Each of the clients 804 and 806 may access the processor 808 and any applications stored thereon via the network 802.

Although the foregoing invention has been described in some detail for purposes of clarity of understanding, it will be apparent that certain changes and modifications may be practiced within the scope of the appended claims. The present invention may be practiced according to the claims without some or all of these specific details. For the purpose of clarity, technical material that is known in the technical fields related to the invention has not been described in detail so that the present invention is not unnecessarily obscured. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A computer-implemented method of storing and outputting data in a cache, the method comprising:
   receiving, by a processor, a request for the data;
   extracting, by the processor, search terms from the request;
   mapping, by the processor, filter settings to a format recognizable by a database in which the data is stored;
   determining, by the processor, a user from which the request originated;

responsive to a determination that the request is initiated by a source user:
  instantiating a source user data access client (DAC);
  mapping a key table from a middleware format to a second format;
  retrieving keys of a navigation target user via the source user DAC;
determining, by the processor, whether the data exists in the cache;
responsive to a determination, by the processor, that the data exists in the cache, retrieving the data from the cache;
responsive to a determination, by the processor, that the data does not exist in the cache, retrieving the data from the database and saving the data to the cache; and
outputting, by the processor, the retrieved data based on the filter settings.

2. The method of claim 1 further comprising:
responsive to a determination, by the processor, that the source user is different from a current user, mapping a key table to a format recognizable by the database in which the data is located.

3. The method of claim 1, further comprising responsive to a determination by the processor that the requested data is in tabular form:
  performing, by the processor, count-call handling; and
  subsequent to the performance of the count-call handling, performing, by the processor, get-data handling.

4. The method of claim 3, wherein the count-call handling includes:
  receiving, by the processor, the request for data, the request including a count of the tabular data;
  responsive to a determination, by the processor, that the requested data does not exist in the cache, saving the count to the cache; and
  constructing, by the processor, a response structure based on the count;
  wherein the count corresponds to at least one of: the number of rows and the number of entries in the tabular data.

5. The method of claim 4, wherein the get-data handling includes:
  receiving, by the processor, the request for data;
  responsive to a determination, by the processor, that the requested data does not exist in the cache, mapping sorting options to a format recognizable by the database, saving the requested data to the cache, and searching a response structure; and
  responsive to a determination, by the processor, that the requested data exists in the cache, using keys for data extraction from the cache and using selection parameters for filtering in the cache; and
  sorting, paging, and filling, by the processor, the response structure;
  wherein a format in which the retrieved data is output is as the response structure.

6. The method of claim 5, wherein the selection parameters are based on the request for data.

7. The method of claim 3, wherein the count-call handling and the get-data handling are each called with a same query and the count-call handling is performed the first time the same query is made, and the get-data handling is performed subsequent times that the same query is made.

8. The method of claim 1, wherein the cache is a cluster table including buckets, the cluster table including:
  a client field representing a client with which data in a bucket of the cluster table is associated;
  a region identifier identifying at least one region in the cluster table that is readable or writable;
  a user identifier identifying a user with whom the cluster table is associated;
  an entity field identifying a middleware entity used to determine a structure of the data in the cluster table;
  a record counter for the at least one readable or writable region of the cluster table;
  a timestamp recording events;
  a line identifier identifying the size of the cluster table;
  a status identifier indicating an availability of the cache; and
  a cluster identifier identifying a length field for user data in the at least one readable or writable region.

9. The method of claim 8, further comprising responsive to a determination that the cache is unavailable, retrieving the data from the database.

10. The method of claim 9, further comprising extracting, by the processor, corresponding node instances from a change object, wherein the change object includes at least one of: a business object, a business object node, a key, a change mode indicating types of changes to be made, and changed attributes.

11. The method of claim 9, further comprising:
  determining, by the processor, that changes made during a session are to be committed;
  wherein the writing of the updated entity instances into the cache is performed responsive to a determination, by the processor, that the changes are to be committed.

12. The method of claim 9, wherein the determination of committing changes is made by a business object processing framework transaction manager, the manager coordinating document changes made within one logic unit of work to related business objects.

13. The method of claim 1, wherein the cache is a database table including a rawstring.

14. The method of claim 1, further comprising:
  responsive to a determination, by the processor, to commit changes made to the cache in a current session, pushing, by the processor, the changes to all users.

15. The method of claim 1, wherein the cache comprises:
  a client field representing a client with which data in a bucket of the cluster table is associated;
  a region identifier identifying at least one region in the cluster table that is readable or writable;
  a user identifier identifying a user with whom the cluster table is associated;
  an entity field identifying a middleware entity used to determine a structure of the data in the cluster table;
  a record counter for the at least one readable or writable region of the cluster table;
  a timestamp recording events;
  a line identifier identifying the size of the cluster table;
  a status identifier indicating an availability of the cache; and
a cluster identifier identifying a length field for user data in the at least one readable or writable region.

16. A computer-implemented method for updating a cache, the method comprising:
  receiving, by a processor, a command to update the cache;
  determining, by the processor, a user from which the command originated;
  responsive to a determination that the request is initiated by a source user:
    instantiating a source user data access client (DAC);
    mapping a key table from a middleware format to a second format;

retrieving keys of a navigation target user via the source user DAC;
identifying, by the processor, a list of entities to be updated;
retrieving, by the processor, updated entity instances; and
writing, by the processor, the updated entity instances into the cache.

17. A computer-implemented method of updating a cache based on a query in a business object processing framework (BOPF), the method comprising:
   instantiating, by a processor, an entity data access client (DAC);
   mapping, by the processor, filter settings from a middleware format to a BOPF format;
   extracting, by the processor, at least one search term from the query;
   instantiating, by the processor, a BOPF service manager;
   setting defaults for paging;
   calculating navigation paths as follows: responsive to a determination that the query is initiated by a source entity:
      instantiating a source entity DAC;
      mapping a key table from the middleware format to the BOPF format;
      retrieving keys of a navigation target entity via the source entity DAC;
   responsive to a determination, by the processor, that no navigation paths are specified, mapping the key table from the middleware format to the BOPF format;
   responsive to a determination, by the processor, that data associated with the at least one search term is stored in the cache:
      retrieving the data from the cache based on the BOPF keys;
      filtering the cache based on BOPF selection parameters and the at least one search term; and
      sorting, paging, and filling a request response structure;
   responsive to a determination by the processor that the data associated with the at least one search term is not stored in the cache:
      mapping middleware sorting options into BOPF sorting options;
      retrieving data via the entity DAC; and
      searching, sorting, paging, and filling the request response structure.

18. The method of claim 17, further comprising responsive to a determination by the processor that the query is for table data, the table data including an associated count, and prior to the setting of defaults for paging:
   responsive to a determination, by the processor, that the count is stored in the cache, retrieving the count;
   responsive to a determination, by the processor, that the count is not stored in the cache:
      retrieving, by the processor, the count from the entity DAC; and
      saving, by the processor, the count from the entity in parallel with the retrieving of the count; and
   constructing, by the processor, the request response structure.

19. The method of claim 17, further comprising responsive to a determination by the processor that the query is for table data and prior to the setting of defaults for paging:
   responsive to a determination, by the processor, that the table data is stored in the cache:
      using keys for data extraction from the cache;
      using selection parameters and search strings for filtering in the cache; and
      sorting, paging, and filling the request response structure;
   responsive to a determination, by the processor, that the table data is not stored in the cache:
      mapping sorting options from the middleware format to the BOPF format;
      retrieving data via the entity DAC; and
      searching, sorting, paging, and filling the request response structure.

20. The method of claim 17, further comprising responsive to a determination, by the processor, to commit changes made to the cache in a current session, updating, by the BOPF service manager, all instances with the changes.

* * * * *